US008559397B2

(12) United States Patent
Huang et al.

(10) Patent No.: US 8,559,397 B2
(45) Date of Patent: Oct. 15, 2013

(54) HANDOVER-RELATED RADIO LINK FAILURE DETECTION

(75) Inventors: Jing-Bo Huang, Suwon-si (KR); Yeong-Seok Kim, Seongnam-si (KR); Chung-keun Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 305 days.

(21) Appl. No.: 12/622,098

(22) Filed: Nov. 19, 2009

(65) Prior Publication Data

US 2011/0117908 A1    May 19, 2011

(51) Int. Cl.
*H04W 4/00* (2009.01)
(52) U.S. Cl.
USPC ........... 370/332; 370/310; 370/328; 370/329; 370/330; 370/331
(58) Field of Classification Search
None
See application file for complete search history.

(56) References Cited

U.S. PATENT DOCUMENTS

| | | | | |
|---|---|---|---|---|
| 2009/0323638 | A1* | 12/2009 | Catovic et al. | 370/331 |
| 2010/0124173 | A1* | 5/2010 | Agashe et al. | 370/245 |
| 2010/0124918 | A1* | 5/2010 | Agashe et al. | 455/423 |
| 2010/0173626 | A1* | 7/2010 | Catovic et al. | 455/423 |
| 2010/0173633 | A1* | 7/2010 | Catovic et al. | 455/436 |
| 2010/0325267 | A1* | 12/2010 | Mishra et al. | 709/224 |
| 2011/0159901 | A1* | 6/2011 | Frenger et al. | 455/502 |

OTHER PUBLICATIONS

R3-091357, Nokia Siemens Networks, 3GPP TSG RAN WG3 Meeting #64, RLF Reports for Mobility Robustness Optimization, May 4-8, 2009, San Francisco.
3GPP TR 36.902 V9.0.0, 3rd Generation Partnerships Project; Technical Specification Group Radio Access Network; Evolved Universal Terrestrial Radio Access Network (E-UTRAN); Self-configuring and self-optimizing network use cases and solutions (Release 9), Technical Report, Sep. 2009.
3GPP TS 23.401 V9.2.0, 3rd Generation Partnership Project; Technical Specification Group Services and System Aspects; General Packet Radio Service (GPRS) enhancements for Evolved Universal Terrestrial Radio Access Network (E-UTRAN) access (Release 9), Technical Specification, Sep. 2009.
3GPP TS 36.300 V9.1.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9), Technical Specification, Sep. 2009.

* cited by examiner

*Primary Examiner* — Hassan Phillips
*Assistant Examiner* — Guatam Sharma
(74) *Attorney, Agent, or Firm* — Jefferson IP Law, LLP

(57) ABSTRACT

A Base Station (BS) apparatus, for detecting a HandOver (HO)-related Radio Link Failure (RLF) in a wireless communication, and method for its operation, are provided. The method includes receiving an HO request from another BS for a User Equipment (UE) that has an established connection with the BS, receiving a connection reestablishment request from the UE after an HO of the UE to the other BS has been performed, determining if the connection reestablishment request is received prior to the expiration of a timer, and if it is determined that the connection reestablishment request is received from the UE prior to the expiration of a timer, determining that an RLF occurred due to a too early HO triggering.

22 Claims, 10 Drawing Sheets

HANDOVER-RELATED RADIO LINK FAILURE DETECTION

BACKGROUND OF THE INVENTION

1. Field of the Invention

The present invention relates to a wireless communication system. More particularly, the present invention relates to an apparatus and method for HandOver (HO)-related Radio Link Failure (RLF) detection in a wireless communication system.

2. Description of the Related Art

Research is being conducted to develop a next generation communication system, also referred to as a $4^{th}$ Generation (4G) communication system or an International Mobile Telecommunications-Advanced (IMT-Advanced) communication system. Representative examples of such a next generation communication system include a communication system based on an Institute of Electrical and Electronics Engineers (IEEE) 802.16m standard (referred to as an IEEE 802.16m system) and a communication system based on a $3^{rd}$ Generation Partnership Project (3GPP) Long Term Evolution (LTE) Advanced standard (referred to as an LTE Advanced system), both of which are under development.

One of the requirements of the next generation communication system is a Self-Organizing Network (SON). A SON allows for automated adjustments to a wireless communication system to optimize performance while providing more efficient Operation and Maintenance (O&M). One of the key functionalities of SON is Mobility Robustness Optimization (MRO). Radio Link Failures (RLFs) may be caused by incorrect or non-optimized HandOver (HO) parameter settings, a Physical Cell Identifier (PCI) collision, etc. RLFs caused by incorrect or non-optimized HO parameter settings have a combined impact on user experience and network resources. Therefore, an objective of MRO should be to reduce the number of HO-related RLFs. Consequently, the cause of the HO-related RLFs needs to be determined so that corrective action may be taken.

HO-related RLFs are described in the 3GPP TR 36.902 v9.0.0 specification, the entire disclosure of which is hereby incorporated by reference. HO-related related RLFs may be categorized as one of failures due to HO to an incorrect cell, failures due to too late HO triggering, and failures due to too early HO triggering. These HO-related RLFs typically occur due to HO parameter settings that are incorrect or not optimized. The 3GPP TR 36.902 v9.0.0 specification further suggests schemes to detect the HO-related RLFs. In addition, schemes to detect the HO-related RLFs have been suggested in 3GPP proposal R3-091357, the entire disclosure of which is hereby incorporated by reference.

Examples of the HO-related RLF categories will be described below with reference to FIGS. 1-4, as will the schemes for detecting the HO-related RLFs proposed by TR 36.902 v9.0.0 and R3-091357.

FIG. 1 illustrates an example of a scenario of HO to an incorrect cell according to the conventional art.

Referring to FIG. 1, a User Equipment (UE) 100, an evolved Node B (eNB) A 110 servicing Cell A 111, an eNB B 112 servicing Cell B 113, and an eNB C 114 servicing Cell C 115 are shown. The service coverage areas of Cell A 111, Cell B 113, and Cell C 115 overlap. Here, the UE 100 has an established connection with the eNB A 110 and is moving into the service coverage area of Cell C 115. Due to the HO parameter settings not being optimized, HO is performed to eNB B 112 instead of eNB C 114. However, the UE 100 experiences an RLF shortly after the UE 100 successfully performs HO to the eNB B 112. Since the UE 100 is within the service coverage area of Cell C 115 and outside or at the outer limits of coverage area of Cell B 113, the UE 100 reestablishes the connection with eNB C 114 instead of eNB B 112.

TR 36.902 v9.0.0 does not propose a scheme for detecting an RLF due to HO to an incorrect cell. The scheme for detecting an RLF due to HO to an incorrect cell proposed by TR R3-091357 includes the eNB B 112 receiving an RLF report from eNB C 114 since the eNB C 114 considers the RLF to be caused by a too late HO. Here, eNB B 112 keeps the context concerning this UE 100 after it has completed the HO from eNB A 110. In this case, eNB B 112 can determine that the RLF is caused by an HO to a wrong cell and then send an RLF report to eNB A 110.

FIG. 2 illustrates an example of a too late HO triggering scenario according to the conventional art.

Referring to FIG. 2, a UE 100, an eNB A servicing Cell A 111, and an eNB B 112 servicing Cell B 113 are shown. The service coverage areas of Cell A 111 and Cell B 113 overlap. Here, the UE 100 has an established connection with the eNB A 110 and is moving into the service coverage area of Cell B 113. However, the UE 100 leaves the service coverage area of Cell A 111 before the HO to eNB B 112 is initiated or before the HO is complete, and thus experiences an RLF with eNB A 110. Since the UE 100 is no longer within the service coverage area of Cell A 111 and is instead within the service coverage area of Cell B 113, the UE 100 reestablishes the connection with eNB B 112 instead of eNB A 110.

The scheme for detecting a too late HO-related RLF proposed by TR 36.902 v9.0.0 includes the eNB B 112 sending an RLF report to eNB A 110 after the UE 100 reestablishes the connection with eNB B 112 instead of eNB A 110. In contrast, the scheme for detecting a too late HO-related RLF proposed by R3-091357 includes the UE 100 sending an RLF report to the eNB B 112 after the UE 100 reestablishes the connection with eNB B 112, and then the eNB B 112 sends an RLF report to eNB A 110.

FIG. 3 illustrates an example of a too early HO triggering scenario according to the conventional art.

Referring to FIG. 3, a UE 100, an eNB A 110 servicing Cell A 111, and an eNB B 112 servicing Cell B 113 are shown. The service coverage areas of Cell A 111 and Cell B 113 overlap. Here, the UE 100 has an established connection with the eNB A 110 and is moving into the service coverage area of Cell B 113. An HO is then successfully performed to the eNB B 112. However, the UE 100 experiences an RLF shortly after the HO. Since the UE 100 is within the service coverage area of Cell A 111 and outside or at the outer limits of coverage area of Cell B 113, the UE 100 reestablishes the connection with eNB A 110 instead of eNB B 112.

The scheme for detecting a too early HO-related RLF proposed by TR 36.902 v9.0.0 includes the eNB B 112 ignoring an RLF report received from eNB A 110, if eNB B 112 sent a UE 100 Context Release message to eNB A 110 that is related to the completion of an incoming HO for the same UE 100 within the last $T_{store\_UE\_cntxt}$ seconds.

In contrast, the scheme for detecting a too early HO-related RLF proposed by R3-091357 includes the eNB A 110 considering the reestablished connection with eNB A 110 instead of eNB B 112 as a too late HO-related RLF and sending an RLF report to eNB B 112. At this time, the eNB B 112 keeps a context related to the UE 100 that the eNB B 112 sent in a UE 100 Context Release message to eNB A 110 during the previous HO procedure. Thus, eNB B 112 can determine that the RLF report sent by eNB A 110 is caused by a too early HO triggering and not a too late HO triggering. Then, eNB B 112 sends an RLF report back to eNB A 110. Here, eNB B 112 will not optimize its HO parameter settings while eNB A 110 will optimize its HO parameter settings.

A flow diagram for detecting a too early HO-related RLF according to R3-091357 is described below with reference to FIG. 4.

FIG. 4 illustrates a flow diagram for detecting a too early HO-related RLF according to the conventional art.

Referring to FIG. 4, an HO procedure is performed in step 400. The HO procedure of step 400 may correspond to a procedure that occurs in FIG. 10.1.2.1.1-1 of the 3GPP TS 36.300 v9.1.0 specification, the entire disclosure of which is hereby incorporated by reference. Alternatively, the HO procedure of step 400 may correspond to a procedure that occurs in FIG. 5.5.1.2.2-1 of the 3GPP TS 23.401 v9.2.0 specification, the entire disclosure of which is hereby incorporated by reference.

Once the HO procedure of step 400 is finished, a UE 100 is serviced by the eNB B 112 in step 402. However, the UE 100 experiences an RLF shortly after the HO in step 404. Since the UE 100 is within the service coverage area of Cell A 111 and outside or at the outer limits of coverage area of Cell B 113, the UE 100 reselects the eNB A 110 as a serving eNB instead of eNB B 112 in step 406. The UE 100 sends a Radio Resource Control (RRC) Connection Reestablishment Request (RRCConnectionReestablishmentRequest) message to the eNB A 110 in step 408 in order to reestablish the connection with eNB A 110.

The eNB A 110 sends an RRC Connection Reestablishment (RRCConnectionReestablishment) message to the UE 100 in step 410. In response, the eNB A 110 sends an RRC Connection Reestablishment Complete (RRCConnectionReestablishment Complete) message to the eNB A 110 in step 412.

The eNB A 110 considers the reestablished connection of the UE 100 with eNB A 110 instead of eNB B 112 as a too late HO-related RLF and sends an RLF report to eNB B 112 in step 414. The eNB B 112 has maintained the context related to the UE 100 that was sent in a UE 100 Context Release message to eNB A 110 during the HO procedure of step 400. Thus, eNB B 112 determines that the RLF report sent by eNB A 110 is caused by too early HO triggering and not by too late HO triggering. The eNB B 112 then sends an RLF report back to eNB A 110 in step 416 indicating that the RLF of step 404 was caused by too early HO triggering. Here, eNB B 112 will not optimize its HO parameter settings while eNB A 110 will optimize its HO parameter settings.

In the HO-related RLF categories described above, neither TR 36.902 v9.0.0 nor R3-091357, provide an adequate solution for detecting the various HO-related RLFs. In particular, neither TR 36.902 v9.0.0 nor R3-091357 provides an adequate solution for detecting too early HO-related RLF. The scheme for detecting too early HO-related RLF in TR 36.902 v9.0.0 is incomplete. In the scheme for detecting too early HO-related RLF proposed in R3-091357, it is a target eNB (eNB B 112 in FIG. 3) that analyzes the cause of the RLF. Having the target eNB analyze the cause of the RLF requires that additional signaling be sent from target eNB to the source eNB (eNB A 110 in FIG. 3).

Therefore, a need exists for an apparatus and method for detecting HO-related RLF in a wireless communication system.

SUMMARY OF THE INVENTION

An aspect of the present invention is to address at least the above-mentioned problems and/or disadvantages and to provide at least the advantages described below. Accordingly, an aspect of the present invention is to provide an apparatus and method for detecting HandOver (HO)-related Radio Link Failure (RLF) in a wireless communication system.

In accordance with an aspect of the present invention, a method for operating a Base Station (BS) for detecting a too early HO-related RLF in a wireless communication system is provided. The method includes receiving an HO request from another BS for a User Equipment (UE) that has an established connection with the BS, receiving a connection reestablishment request from the UE after an HO of the UE to the other BS has been performed, determining if the connection reestablishment request is received prior to the expiration of a timer, and if it is determined that the connection reestablishment request is received from the UE prior to the expiration of a timer, determining that an RLF occurred due to a too early HO triggering.

In accordance with an aspect of the present invention, a BS apparatus for detecting a too early HO-related RLF in a wireless communication system is provided. The apparatus includes a first receiver for receiving signals from another BS, a second receiver for receiving signals from a UE, and a controller. The controller controls to receive an HO request via the first receiver from the other BS for the UE that has an established connection with the BS, controls to receive via the second receiver a connection reestablishment request from the UE after an HO of the UE to the other BS has been performed, determines if the connection reestablishment request is received prior to the expiration of a timer, and if it is determined that the connection reestablishment request is received from the UE prior to the expiration of a timer, determines that an RLF occurred due to a too early HO triggering.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1:
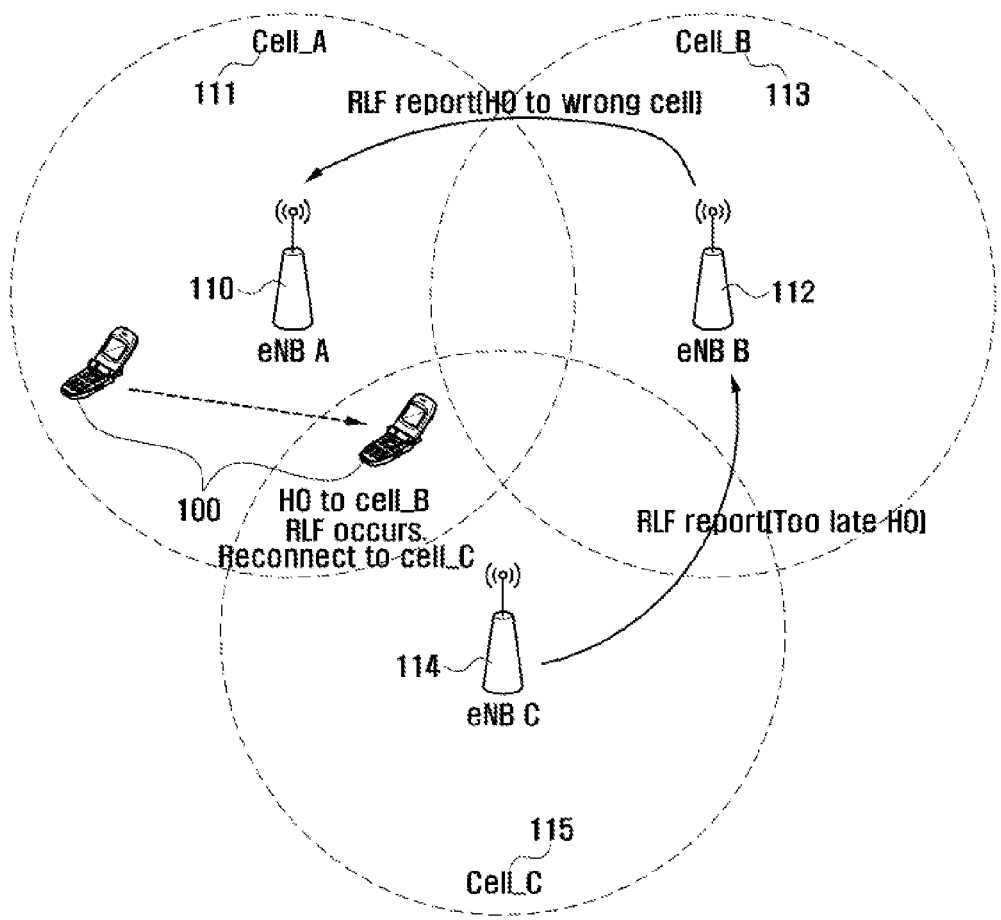
FIG. 1 illustrates an example of a too late HandOver (HO) triggering scenario according to the conventional art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention described below relate to detecting HandOver (HO)-related Radio Link Failure (RLF) in a wireless communication system. More specifically, exemplary embodiments of the present invention described below relate to a hierarchical architecture for Mobility Robustness Optimization (MRO) and a technique for detecting HO-related RLF for MRO. Detecting HO-related RLF according to exemplary embodiments of the present invention minimizes signaling overhead and increases the rate at which MRO may be implemented.

It should be understood that the following description refers to terms utilized in various standards merely for simplicity of explanation. For example, the following description refers to terms utilized in the 3$^{rd}$ Generation Partnership Project (3GPP) Long Term Evolution (LTE) Advanced standard. However, this description should not be interpreted as being limited to the 3GPP LTE Advanced standard. Independent of the mechanism used for detecting too early HO-related RLF, it is preferable to use too early HO-related RLF detection and it is advantageous for that ability to conform to a standardized mechanism.

Hereafter, an evolved Node B (eNB) may also be referred to as a Base Station (BS). In an HO scenario, an eNB from which a User Equipment (UE) is handed over from may be referred to as a source eNB and the eNB to which the UE is handed over to may be referred to as target eNB.

A hierarchical architecture for MRO according to an exemplary embodiment of the present invention will be described below with reference to FIG. 5.

Figure 5:
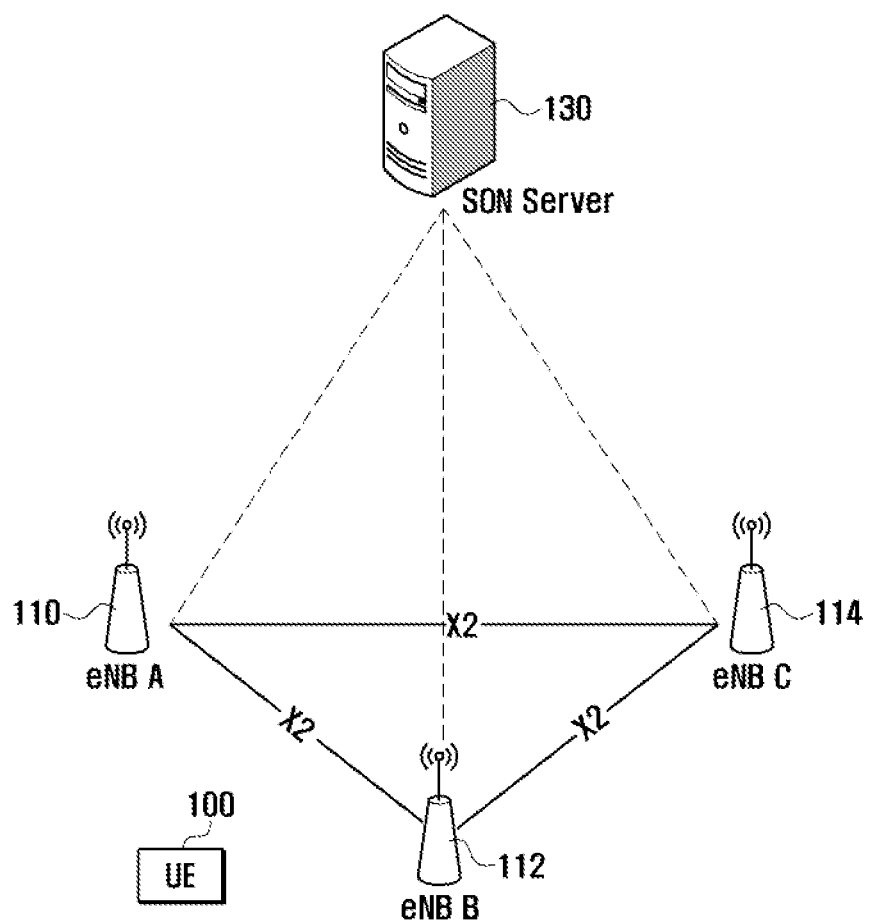
FIG. 5 illustrates a hierarchical architecture for Mobility Robustness Optimization (MRO) according to an exemplary embodiment of the present invention.

FIG. 5 illustrates a hierarchical architecture for MRO according to an exemplary embodiment of the present invention.

Referring to FIG. 5, the hierarchical architecture for MRO includes a UE 100, an eNB A 110, an eNB B 112, an eNB C 114 and a Self-Organizing Network (SON) Server 130. The eNB A 110, eNB B 112, and eNB C 114 communicate with each other through an X2 interface. Thus, an RLF report from one eNB would be sent to another eNB through an X2 interface. Alternatively, the RLF report may be sent through an S1 interface. The SON Server 130 may be any Operation and Maintenance (O&M) entity and should exist in the core network. While an algorithm for MRO should be carried out in the eNBs, network operators should utilize the SON Server 130 to configure the valid range of MRO parameter settings and other configuration settings, such as those described in section 4.5.4 of the 3$^{rd}$ Generation Partnership Project (3GPP) TR 36.902 v9.0.0 specification. To support such functionality, the eNBs should also send RLF reports to the SON Server 130 so that the SON Server 130 may optimize such parameter settings and other configuration settings.

A procedure to support MRO according to an exemplary embodiment of the present invention is described below with reference to FIG. 6.

Figure 6:
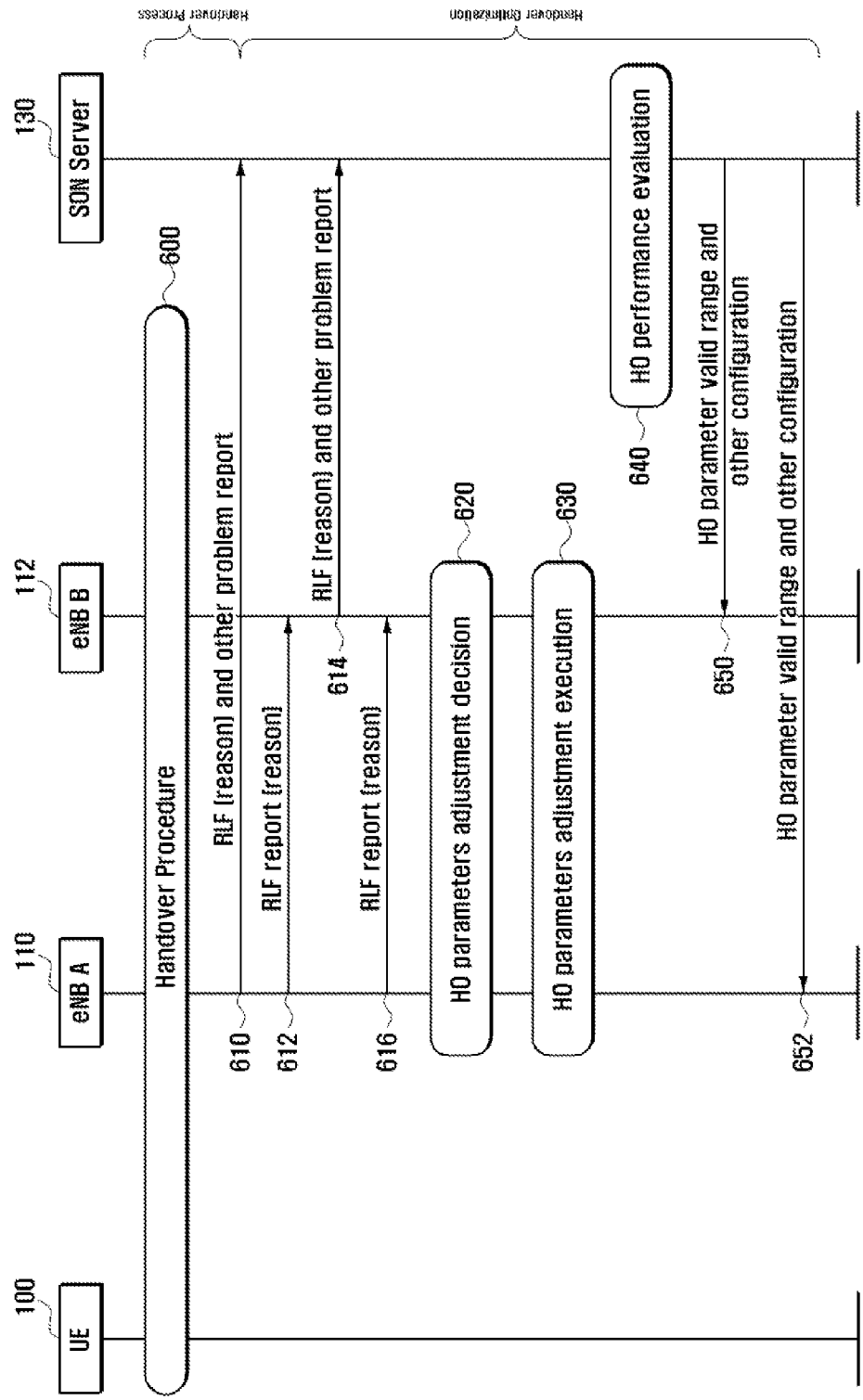
FIG. 6 illustrates a flow diagram for an MRO procedure according to an exemplary embodiment of the present invention.

FIG. 6 illustrates a flow diagram for an MRO procedure according to an exemplary embodiment of the present invention.

Referring to FIG. 6, an HO is performed for the UE 100 between an eNB A 110 and an eNB B 112 in step 600. The HO may be performed utilizing conventional HO signaling. For simplicity in explication, it is assumed that the eNB A 110 is responsible for the HO-related RLF detection. However, if eNB B 112 is responsible for the HO-related RLF detection, the roles of eNB B 112 and eNB A 110 are reversed. Here, if an RLF caused by inappropriate HO settings occurs, eNB A 110 will detect the HO-related RLF and will send an RLF report with reason for the RLF (i.e., HO to wrong cell, too early HO triggering, too late HO triggering, etc.) and its HO parameter settings to the SON Server 130 in step 610 and the eNB B 112 in step 612. Other problem reports, such as pingponging, unwanted HOs, etc. may also be included in the report sent from eNB A 110 to the SON Server 130 at step 610. Depending on the scenario, eNB B 112 may have additional detecting and reporting responsibilities. In this case, eNB B 112 will detect the HO-related RLF and will send an RLF report with a reason for the RLF (i.e., HO to wrong cell, too early HO triggering, too late HO triggering, etc.) and its HO parameter settings to the SON Server 130 in step 614 and the eNB A 110 in step 616. Other problem reports, such as pingponging, unwanted HOs, etc. may also be included in the report sent from eNB B 112 to the SON Server 130 in step 614.

The eNB A 110 and eNB B 112 make an HO parameter adjustment decision in step 620. The HO parameter adjustment decision made by eNB A 110 and eNB B 112 are outside the scope of this exemplary embodiment of the present invention. Accordingly, a description thereof will be omitted. The eNB A 110 and eNB B 112 adjust the HO parameter settings in step 630 based on the HO parameter adjustment decision made at step 620. The adjustment of the HO parameter settings by eNB A 110 and eNB B 112 are outside the scope of this exemplary embodiment of the present invention. Accordingly, a description thereof will be omitted. Based on the RLF reports received from eNB A 110 (and optionally from eNB B 112), the SON Server 130 evaluates system performance and decides a valid range of the HO parameter settings and other configuration settings in step 640. The other configurations may include one or more of $T_{store\_UE\_cntxt}$ as described in 4.5.4 of TR 36.902 v9.0.0 and $T_{too\_early}$ as described below according to an exemplary embodiment of the present invention. The SON Server 130 sends a valid range of HO parameter settings and other configuration settings to the eNB A 110 in step 650 and to the eNB B 112 in step 652. One of step 650 and step 652 may be omitted and steps 640, 650 and 652 may occur before step 620. In addition, the steps 600-652 may be repeated as needed.

The RLF reports should include a reason for the RLF. Thus, the RLF report may include the elements shown in Table 1.

TABLE 1

| | |
|---|---|
| Failure Cell IDentifier (ID) | Physical Cell ID (PCI) of cell with which RLF occurred. |
| Reestablishment Cell ID | PCI and (optionally) Evolved Cell Global ID (ECGI) of the cell with which Radio Link (RL) reestablishment attempt is made. |
| Cell-Radio Network Temporary ID (C-RNTI) | C-RNTI of UE in the cell with which RLF occurred. |
| Reason | One of HO to wrong cell, too early HO triggering, too late HO triggering, etc. |

Techniques for detecting an HO-related RLF for MRO according to exemplary embodiments of the present invention will be described below. More specifically, detection of an HO-related RLF due to HO to a wrong cell, a too late HO triggering and a too early HO trigger, according to exemplary embodiments of the present invention will be described below, will be described below.

The detection of an HO-related RLF due to HO to a wrong cell will now be described. Detection of HO-related RLF due to HO to a wrong cell according to an exemplary embodiment of the present invention is similar to the detection of HO-related RLF due to HO to a wrong cell proposed by the 3GPP proposal R3-091357 and discussed above with reference to FIG. 1. However, the detection of HO-related RLF due to HO to a wrong cell according to an exemplary embodiment of the present invention differs in that once the eNB B 112 determines that the RLF is caused by HO to a wrong cell, the eNB B 112 sends an RLF report, indicating that the HO-related RLF was caused by HO to a wrong cell, to both eNB A 110 and eNB C. Then eNB A 110 sends an RLF report, indicating that the HO-related RLF was caused by HO to a wrong cell, to a SON Server 130. Consequently, the eNB A 110, eNB B 112, eNB C 114, and SON Server 130 are all made aware that the HO-related RLF was caused by HO to a wrong cell.

Figure 2:
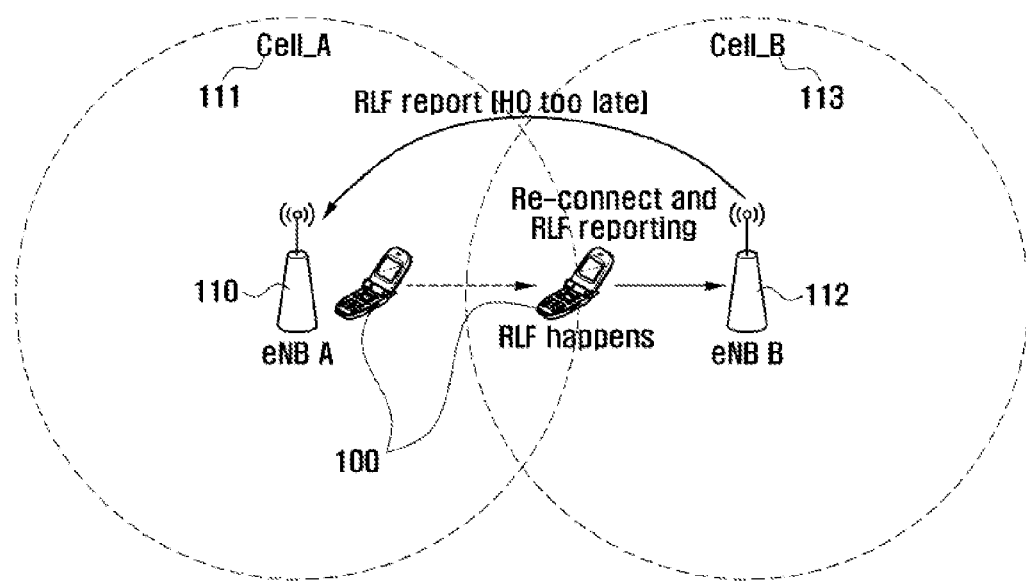
FIG. 2 illustrates an example of a too early HO triggering scenario according to the conventional art.
Figure 3:
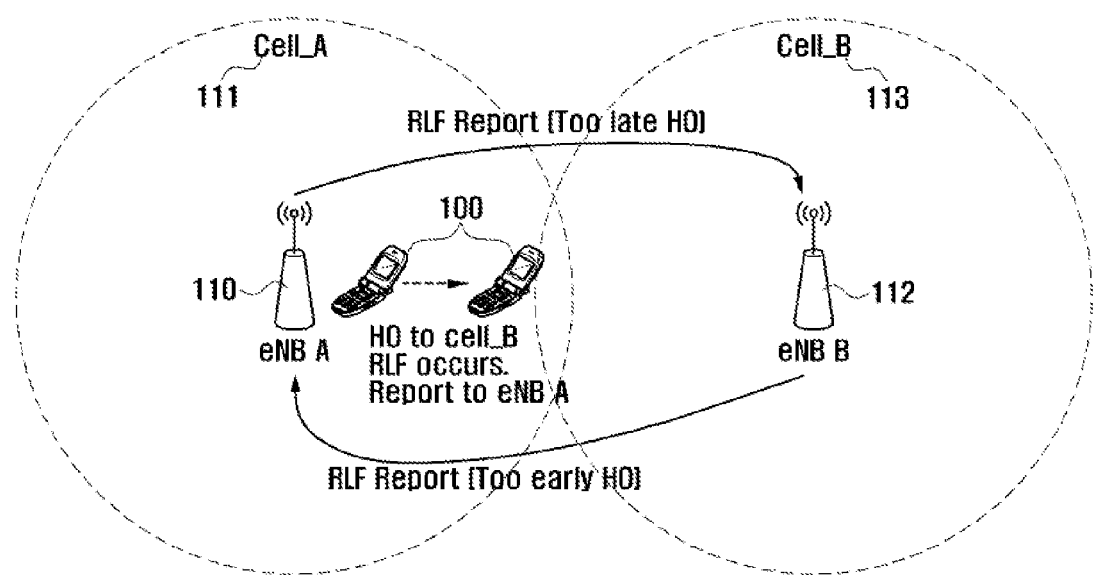
FIG. 3 illustrates an example of a scenario of HO to an incorrect cell according to the conventional art.
Figure 4:
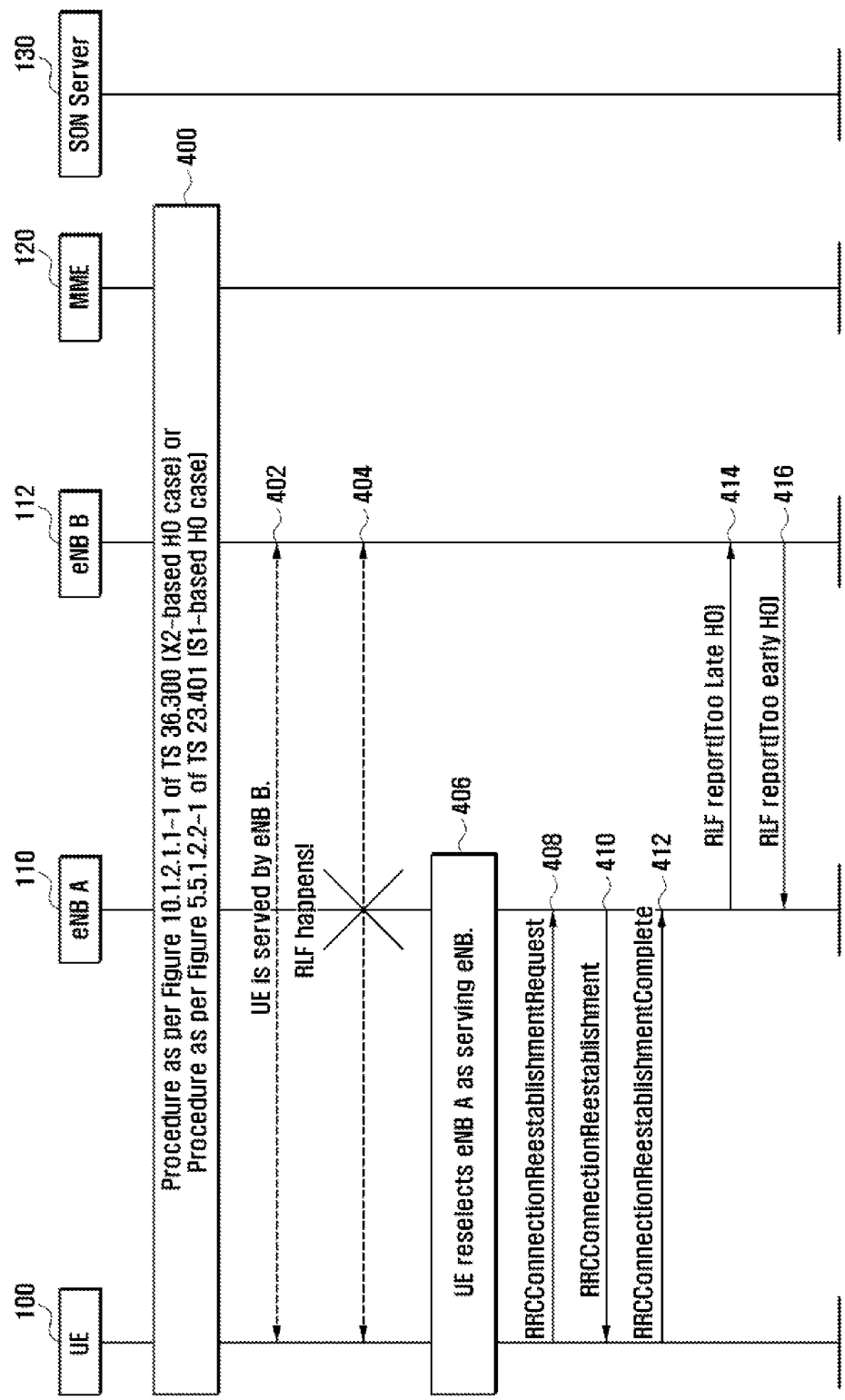
FIG. 4 illustrates a flow diagram for detecting a too early HO-related Radio Link Failure (RLF) according to the conventional art.

The detection of an HO-related RLF due to a too late HO triggering will now be described. Detection of HO-related RLF due to a too late HO triggering according to an exemplary embodiment of the present invention is similar to the detection of HO-related RLF due to a too late HO triggering proposed by the 3GPP TR 36.902 v9.0.0 specification and discussed above with reference to FIG. 2. However, the detection of HO-related RLF due to a too late HO triggering according to an exemplary embodiment of the present invention differs in that if the UE 100 reestablishes the connection at eNB B 112 after an RLF with eNB A 110, then eNB B 112 sends an RLF report, indicating that the HO-related RLF was caused by a too late HO triggering, to eNB A 110. If eNB A 110 determines that this RLF was not caused by HO to a wrong cell, eNB A 110 will confirm that this RLF is caused by a too late HO triggering and send an RLF report, indicating that the HO-related RLF was caused by a too late HO triggering, to a SON Server 130.

The detection of an HO-related RLF due to too early HO triggering will now be described. An example of a too early HO triggering scenario according to an exemplary embodiment of the present invention will be described below with reference to FIG. 7.

Figure 7:
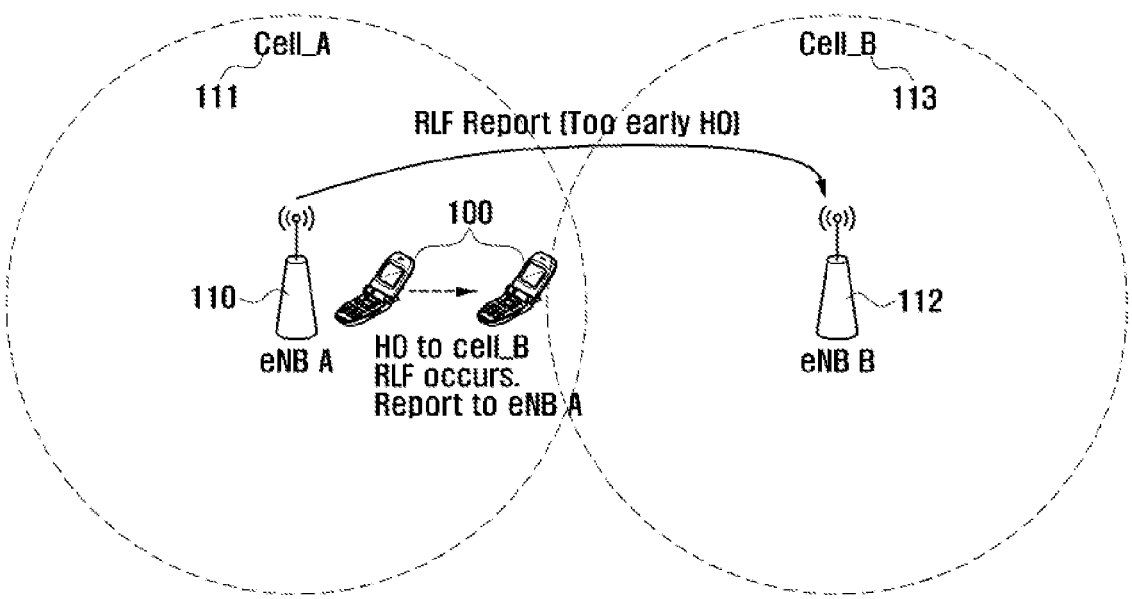
FIG. 7 illustrates an example of a too early HO triggering scenario according to an exemplary embodiment of the present invention.

FIG. 7 illustrates an example of a too early HO triggering scenario according to an exemplary embodiment of the present invention.

Referring to FIG. 7, a UE 100, an eNB A 110 servicing Cell A 111, and an eNB B 112 servicing Cell B 113 are shown. The service coverage areas of Cell A 111 and Cell B 113 overlap. Here, the UE 100 has an established connection with the eNB A 110 and is moving into the service coverage area of Cell B 113. An HO for the UE 100 is then successfully performed to the eNB B 112. However, the UE 100 experiences an RLF shortly after the HO. Since the UE 100 is within the service coverage area of Cell A 111 and outside or at the outer limits of coverage area of Cell B 113, the UE 100 reestablishes the connection with eNB A 110 instead of eNB B 112. According to an exemplary embodiment of the present invention, the eNB A 110 detects the too early HO-related RLF and may optionally send an RLF report to eNB B 112.

The detection of a too early HO-related RLF according to an exemplary embodiment of the present invention will be described in detail below. Herein, the signal flow varies depending on whether eNBs communicate through an X2 interface (hereafter referred to as X2-based HO) or an S1 interface (hereafter referred to as S1-based HO).

Signal flows for the detection of a too early HO-related RLF for X2-based HO according to an exemplary embodiment of the present invention will be described below with reference to FIG. 8.

Figure 8:
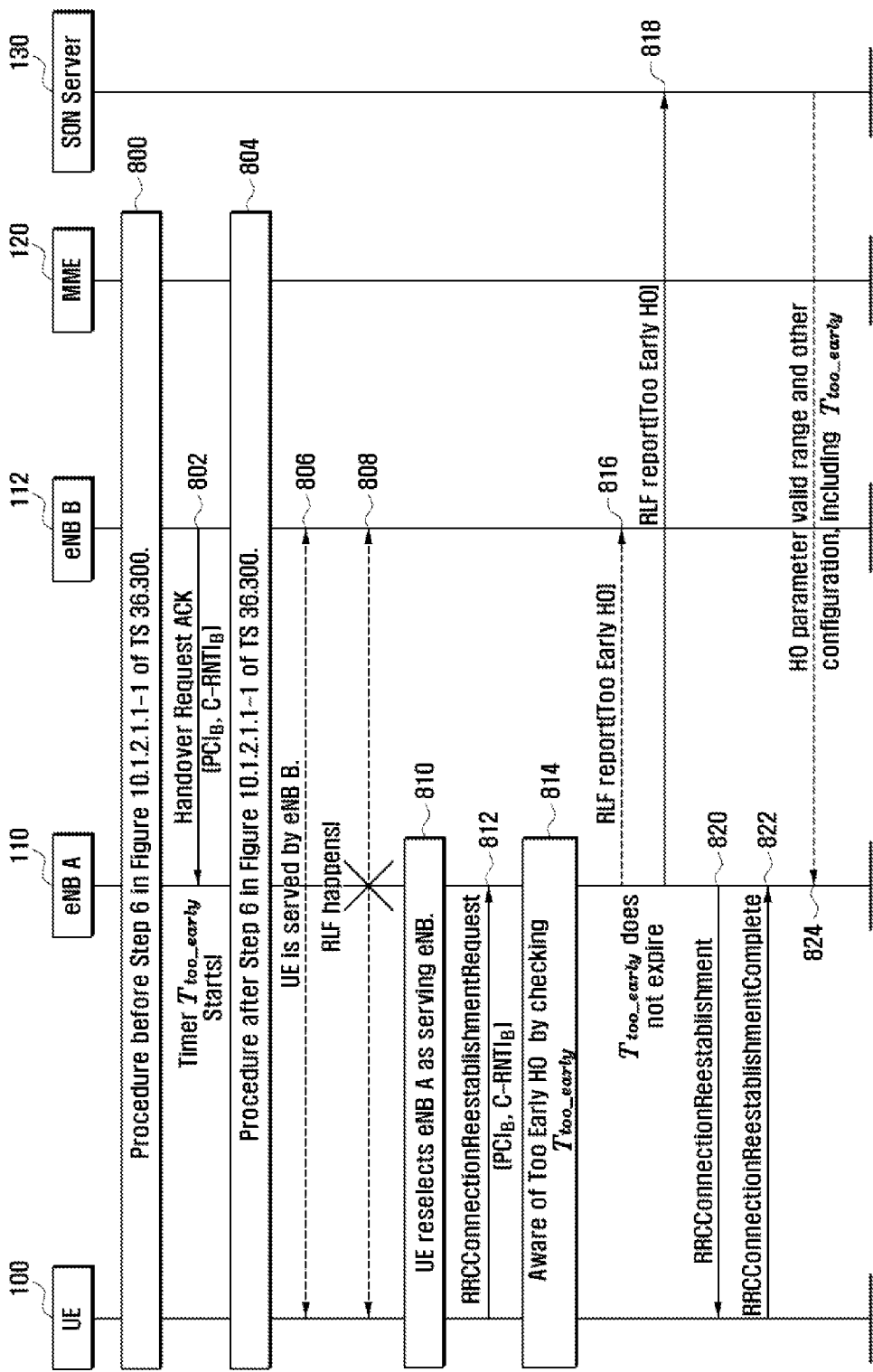
FIG. 8 illustrates a flow diagram for detecting a too early HO-related RLF for an X2-based HO according to an exemplary embodiment of the present invention.

FIG. 8 illustrates a flow diagram for detecting a too early HO-related RLF for an X2-based HO according to an exemplary embodiment of the present invention.

Referring to FIG. 8, an HO procedure is initiated in step 800. The initiation of the HO procedure of step 800 may correspond to a procedure that occurs before step 6 of FIG. 10.1.2.1.1-1 of the 3GPP TS 36.300 v9.1.0 specification. An HO Request ACKnowledgement (ACK) (transparent container) message is sent from eNB B 112 to eNB A 110 in step 802. The transparent container may include a C-RNTI assigned by eNB B 112 (C-RNTI$_B$) and cell ID of Cell B 113 (PCI$_B$). Once eNB A 110 receives this message, eNB A 110 will start a timer $T_{too\_early}$ and store the C-RNTI$_B$ and PCI$_B$. If $T_{too\_early}$ expires, eNB A 110 may delete C-RNTI$_B$ and PCI$_B$, which is related to the HO.

The HO procedure is completed in step 804. The completion of the HO procedure of step 804 may correspond to a procedure that occurs after step 6 of FIG. 10.1.2.1.1-1 of the 3GPP TS 36.300 v9.1.0 specification. Once the HO procedure is finished, the UE 100 is serviced by the eNB B 112 in step 806. However, the UE 100 experiences an RLF shortly after the HO in step 808. Since the UE 100 is within the service coverage area of Cell A 111 and outside or at the outer limits of coverage area of Cell B 113, the UE 100 reselects the eNB A 110 as a serving eNB instead of eNB B 112 in step 810. The UE 100 sends a Radio Resource Control (RRC) Connection Reestablishment Request (RRCConnectionReestablishmentRequest) message to the eNB A 110 in step 812 in order to reestablish the connection with eNB A 110. The RRCConnectionReestablishmentRequest message may include the PCI$_B$ and the C-RNTI$_B$.

Upon receiving the RRCConnectionReestablishmentRequest message, the eNB A 110 detects that the UE 100 has experienced a too early HO triggering in step 814. To detect if the UE 100 has experienced a too early handover, the eNB A 110 determines if $T_{too\_early}$ has expired before receiving the RRCConnectionReestablishmentRequest message. If $T_{too\_early}$ has not expired before receiving the RRCConnectionReestablishmentRequest message, the eNB A 110 checks the $PCI_B$ and $C-RNTI_B$ included in the RRCConnectionReestablishmentRequest message. If the $PCI_B$ and $C-RNTI_B$ are the same as the buffered $PCI_B$ and $C-RNTI_B$, eNB A 110 is able to detect that the UE 100 has just handed over from eNB A 110 to eNB B 112 a short time ago and thereby determines that UE 100 has experienced a too early HO triggering. By checking the $PCI_B$ and $C-RNTI_B$, the eNB A 110 can also distinguish if the RLF was caused by PCI collision.

The eNB A 110 sends an RLF report to eNB B 112 in step 816 indicating that the HO-related RLF was caused by a too early HO triggering to eNB B 112. Herein, the sending of the RLF report to eNB B 112 in step 816 is optional. If eNB is able to optimize its HO parameter settings by itself, the sending of the RLF report to eNB B 112 in step 816 may be omitted. However, if both the eNB A 110 and eNB B 112 should be aware of the cause of the RLF in order to perform MRO, the eNB A 110 may send the RLF report to eNB B 112 in step 816.

The eNB A 110 sends an RLF report to a SON Server 130 in step 818 indicating that the HO-related RLF was caused by a too early HO triggering to eNB B 112.

The eNB A 110 sends an RRC Connection Reestablishment (RRCConnectionReestablishment) message to the UE 100 in step 820. In response, UE 100 sends an RRC Connection Reestablishment Complete (RRCConnectionReestablishmentComplete) message to the eNB A 110 in step 822. At least one of steps 820 and 822 may be performed before, simultaneously, or after the performance of step 814.

If the SON Server 130 decides that the valid range of HO parameter settings or other configuration settings should be changed, the SON Server 130 will send a message with the HO parameter settings or other configuration settings to one or both of eNB A 110 and eNB B 112 in step 824. Here, the SON Server 130 may also have the capability to configure the parameter $T_{too\_early}$.

Signal flows for the detection of a too early HO-related RLF for S1-based HO according to an exemplary embodiment of the present invention will be described below with reference to FIG. 9.

Figure 9:
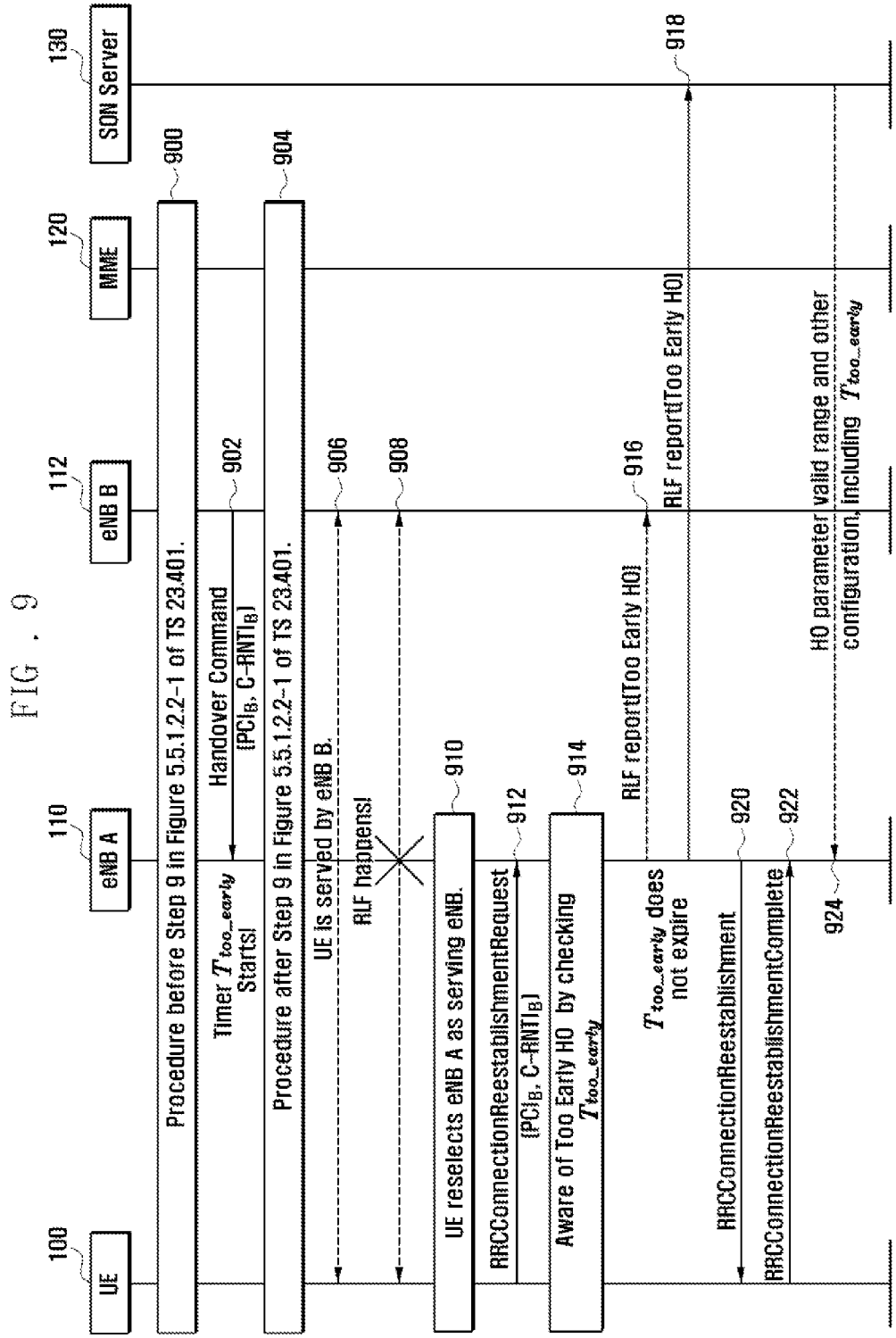
FIG. 9 illustrates a flow diagram for detecting a too early HO-related RLF for an S1-based HO according to an exemplary embodiment of the present invention.

FIG. 9 illustrates a flow diagram for detecting a too early HO-related RLF for an S1-based HO according to an exemplary embodiment of the present invention.

Referring to FIG. 9, an HO procedure is initiated in step 900. The initiation of the HO procedure of step 900 may correspond to a procedure that occurs before step 9 of FIG. 5.5.1.2.2-1 of the 3GPP TS 23.401 v9.2.0 specification. An HO Command (Target to Source transparent container) message is sent from eNB B 112 to eNB A 110 via a S1 interface and a Mobility Management Entity (MME) 120 in step 902. The Target to Source transparent container may include a $C-RNTI_B$ and a $PCI_B$. Once eNB A 110 receives this message, eNB A 110 will start a timer $T_{too\_early}$ and store the $C-RNTI_B$ and $PCI_B$. If $T_{too\_early}$ expires, eNB A 110 may delete $C-RNTI_B$ and $PCI_B$, which is related to the HO.

The HO procedure is completed in step 904. The completion of the HO procedure of step 904 may correspond to a procedure that occurs after step 9 of FIG. 5.5.1.2.2-1 of the 3GPP TS 23.401 v9.2.0 specification. Once the HO procedure is finished, the UE 100 is serviced by the eNB B 112 in step 906. However, the UE 100 experiences an RLF shortly after the HO in step 908. Since the UE 100 is within the service coverage area of Cell A 111 and outside or at the outer limits of coverage area of Cell B 113, the UE 100 reselects the eNB A 110 as a serving eNB instead of eNB B 112 in step 910. The UE 100 sends an RRCConnectionReestablishmentRequest message to the eNB A 110 in step 912 in order to reestablish the connection with eNB A 110. The RRCConnectionReestablishmentRequest message may include the $PCI_B$ and the $C-RNTI_B$.

Upon receiving the RRCConnectionReestablishmentRequest message, the eNB A 110 detects that the UE 100 has experienced a too early HO triggering in step 914. To detect if the UE 100 has experienced a too early handover, the eNB A 110 determines if $T_{too\_early}$ has expired before receiving the RRCConnectionReestablishmentRequest message. If $T_{too\_early}$ has not expired before receiving the RRCConnectionReestablishmentRequest message, the eNB A 110 checks the $PCI_B$ and $C-RNTI_B$ included in the RRCConnectionReestablishmentRequest message. If the $PCI_B$ and $C-RNTI_B$ are the same as the buffered $PCI_B$ and $C-RNTI_B$, eNB A 110 is able to detect that the UE 100 has just handed over from eNB A 110 to eNB B 112 a short time ago and thereby determines that UE 100 has experienced a too early HO triggering. By checking the $PCI_B$ and $C-RNTI_B$, the eNB A 110 can also distinguish if the RLF was caused by PCI collision.

The eNB A 110 sends an RLF report to eNB B 112 in step 916 indicating that the HO-related RLF was caused by a too early HO triggering to eNB B 112. Herein, the sending of the RLF report to eNB B 112 in step 916 is optional. If eNB is able to optimize its HO parameter settings by itself, the sending of the RLF report to eNB B 112 in step 916 may be omitted. However, if both the eNB A 110 and eNB B 112 should be aware of the cause of the RLF in order to perform MRO, the eNB A 110 may send the RLF report to eNB B 112 in step 916.

The eNB A 110 sends an RLF report to a SON Server 130 in step 918 indicating that the HO-related RLF was caused by a too early HO triggering to eNB B 112.

The eNB A 110 sends an RRCConnectionReestablishment message to the UE 100 in step 920. In response, the UE 100 sends an RRCConnectionReestablishmentComplete message to the eNB A 110 in step 922. At least one of steps 920 and 922 may be performed before, simultaneously, or after the performance of step 914.

If the SON Server 130 decides that the valid range of HO parameter settings or other configuration settings should be changed, the SON Server 130 will send a message with the HO parameter settings or other configuration settings to one or both of eNB A 110 and eNB B 112 in step 924. Here, the SON Server 130 may also have the capability to configure the parameter $T_{too\_early}$.

A structure of an eNB for detecting an HO-related RLF according to an exemplary embodiment of the present invention will be described below with reference to FIG. 10.

Figure 10:
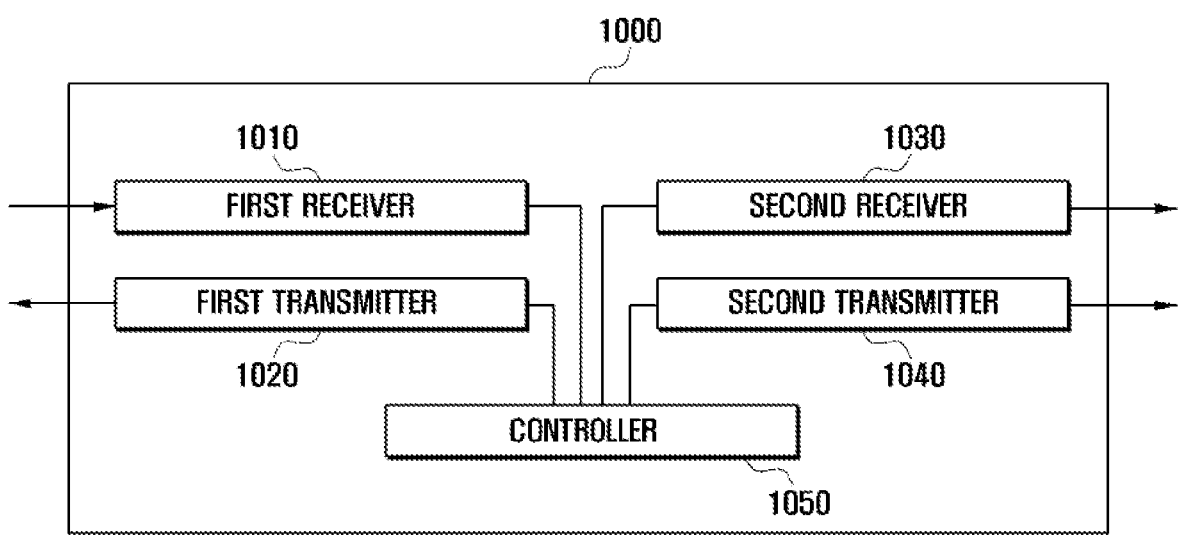
FIG. 10 illustrates a structure of an evolved Node B (eNB) for detecting an HO-related RLF according to an exemplary embodiment of the present invention.

FIG. 10 illustrates a structure of an evolved Node B (eNB) for detecting an HO-related RLF according to an exemplary embodiment of the present invention.

Referring to FIG. 10, the eNB 1000 includes a first receiver 1010, a first transmitter 1020, a second receiver 1030, a second transmitter 1040, and a controller 1050. The eNB 1000 may include any number of additional structural elements. However, a description of additional structural elements of the terminal is omitted for conciseness of description.

The first receiver 1010 receives signals from at least one of another eNB, an MME, and a SON Server. The first transmitter 1020 transmits signals to at least one of another eNB, an MME, and a SON Server. The first receiver 1010 and the first transmitter 1020 may be a transceiver.

The second receiver 1030 receives signals from a UE. The second receiver 1030 may support a Radio Access Technology (RAT) of the LTE network. The second transmitter 1040 transmits signals to the terminal. The second transmitter 1040 may support the RAT according to the 3GPP LTE Advanced standard. The second receiver 1030 and the second transmitter 1040 may be a transceiver.

The controller 1050 controls the first receiver 1010, the first transmitter 1020, the second receiver 1030, and the second transmitter 1040, and controls the operations of the eNB 1000. The operations of the eNB include any of operations explicitly or implicitly described above as being performed by an eNB. For example, the controller 1040 may control to receive an HO request via the first receiver from the other BS for the UE that has an established connection with the BS, control to receive via the second receiver a connection reestablishment request from the UE after an HO of the UE to the other BS has been performed, determine if the connection reestablishment request is received prior to the expiration of a timer, and if it is determined that the connection reestablishment request is received from the UE prior to the expiration of a timer, determine that an RLF occurred between the UE and the other BS due to a too early HO triggering.

Accordingly, exemplary embodiments of the present invention provide a hierarchical architecture and a technique for HO-related RLF detection for MRO. By differentiating the causes of the HO-related RLF, the eNBs involved in the HO and a SON Server may be aware the causes of the HO-related RLF. Thus, the eNBs and/or the SON Server may be able to determine how to optimize the HO parameter settings.

With respect to too early HO detection, since the source eNB determines the cause of the HO-related RLF, signaling overhead can be reduced and the amount of time it takes to determine the cause of HO-related RLF can be reduced, as compared to the conventional art. More specifically, too early HO detection according to exemplary embodiments of the present invention has two main advantages over the conventional art. First, the mandatory signaling is reduced from two messages to one message. Thereby, the signaling overhead is reduced. Second, the cause of RFL in a too early HO triggering scenario is determined immediately after the source eNB receives an RRCConnectionReestablishmentRequest message from a UE. In the conventional art, the final determination of the cause of RFL in a too early HO triggering scenario can only be achieved after the source eNB receives the RLF report indicating a too early HO triggering from the target eNB. Thus, the too early HO detection according to exemplary embodiments of the present invention may enable the eNB and/or SON Server to optimize the handover parameter settings at least half of the Round Trip Time (RTT) between these two eNBs earlier than the conventional art.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a Base Station (BS) for detecting a too early HandOver (HO)-related Radio Link Failure (RLF) in a wireless communication system, the method comprising:
   receiving an HO request from another BS for a User Equipment (UE) that has an established connection with the BS, wherein the HO request includes at least one identifier;
   receiving a connection reestablishment request from the UE after an HO of the UE to the other BS has been performed, wherein the connection reestablishment request includes at least one identifier;
   determining if the connection reestablishment request is received prior to the expiration of a timer;
   determining if the at least one identifier included in the HO request received from the other BS and the connection reestablishment request received from the UE are identical;
   if it is determined that the connection reestablishment request is received from the UE prior to the expiration of a timer, determining that an RLF occurred due to a too early HO triggering;
   if it is determined that the RLF occurred due to a too early HO triggering, sending a report to a Self-Organizing Network (SON) Server indicating that the RLF occurred due to the too early HO triggering, and
   receiving a message from the SON Server comprising at least a timer setting corresponding to an amount of time for determining whether an RLF occurs due to too early HO triggering, wherein the timer setting is configured based on the report sent to the SON Server.

2. The method of claim 1, wherein the timer is initiated upon receiving the HO request from the other BS.

3. The method of claim 1, further comprising sending a report to the other base station indicating that the RLF occurred due to the too early HO triggering.

4. The method of claim 1,
   wherein it is determined that the RLF occurred due to the too early HO triggering, if it is determined that the connection reestablishment request is received from the UE prior to the expiration of a timer, and if it is determined that the at least one identifier included in the HO request received from the other BS and connection reestablishment request received from the UE are identical.

5. The method of claim 4, wherein the at least one identifier comprises at least one of an identifier of the UE assigned by the other BS and a cell identifier of the other BS.

6. The method of claim 4, further comprising storing the at least one identifier received in the HO request from the other BS.

7. The method of claim 1, wherein the HO request is received from the other BS via an X2 interface.

8. The method of claim 1, wherein the HO request is received from the other BS via an S1 interface.

9. A Base Station (BS) apparatus for detecting a too early HandOver (HO)-related Radio Link Failure (RLF) in a wireless communication system, the apparatus comprising:
   a first receiver for receiving signals from another BS;
   a second receiver for receiving signals from a User Equipment (UE);
   a first transmitter for transmitting signals to a Self-Organizing Network (SON) Server;
   a controller for controlling to receive an HO request via the first receiver from the other BS for the UE that has an established connection with the BS, wherein the HO request includes at least one identifier, for controlling to receive via the second receiver a connection reestablishment request from the UE after an HO of the UE to the other BS has been performed, wherein the connection reestablishment request includes at least one identifier, for determining if the connection reestablishment request is received prior to the expiration of a timer, for determining if the at least one identifier included in the HO request received from the other BS and the connection reestablishment request received from the UE are identical, if it is determined that the connection reestablishment request is received from the UE prior to the expiration of a timer, for determining that an RLF occurred due to a too early HO triggering, and if it is determined that the RLF occurred due to a too early HO triggering, for controlling to send a report to the SON Server via the first transmitter that indicates that the RLF occurred due to the too early HO triggering, and for controlling to receive a message from the SON Server comprising at least a timer setting corresponding to an amount of time for determining whether an RLF occurs due to too early HO triggering, wherein the timer setting is configured based on the report sent to the SON Server.

10. The apparatus of claim 9, wherein the controller initiates the timer when the HO request is received via the first receiver from the other BS.

11. The apparatus of claim 9, further comprising a first transmitter for transmitting signals to the other BS,
wherein the controller controls to send a report to the other base station via the first transmitter that indicates that the RLF occurred due to the too early HO triggering.

12. The apparatus of claim 9,
wherein the controller determines that the RLF occurred due to the too early HO triggering, if it is determined that the connection reestablishment request is received from the UE prior to the expiration of a timer, and if it is determined that the at least one identifier included in the HO request received from the other BS and connection reestablishment request received from the UE are identical.

13. The apparatus of claim 12, wherein the at least one identifier comprises at least one of an identifier of the UE assigned by the other BS and a cell identifier of the other BS.

14. The apparatus of claim 12, further wherein the controller stores the at least one identifier received in the HO request from the other BS via the first receiver.

15. The apparatus of claim 9, wherein the HO request is received from the other BS via the first receiver is received via an X2 interface.

16. The apparatus of claim 9, wherein the HO request is received from the other BS via the first receiver is received via an S1 interface.

17. The apparatus of claim 9, wherein the first receiver is configured for receiving signals from the SON, and wherein the signals comprise a message from the SON Server that comprises new HO parameter settings.

18. The apparatus of claim 17, wherein the message received from the SON Server comprises configuration settings relating to an amount of time during which the timer operates from when the timer is initialized and when the time expires.

19. The method of claim 1, further comprising receiving a message from the SON Server, wherein the message comprises new HO parameter settings.

20. The method of claim 19, wherein the message received from the SON Server comprises configuration settings relating to an amount of time during which the timer operates from when the timer is initialized and when the time expires.

21. The method of claim 1, wherein the determining if the at least one identifier included in the HO request received from the other BS and the connection reestablishment request received from the UE are identical comprises:
comparing the at least one identifier included in the connection reestablishment request with a corresponding at least one identifier buffered in the BS.

22. The apparatus of claim 9, wherein the determining if the at least one identifier included in the HO request received from the other BS and the connection reestablishment request received from the UE are identical comprises:
comparing the at least one identifier included in the connection reestablishment request with a corresponding at least one identifier buffered in the BS.

* * * * *